United States Patent
Altman

(10) Patent No.: US 7,226,108 B2
(45) Date of Patent: Jun. 5, 2007

(54) HORIZONTAL BED COVER LIFT SYSTEM

(76) Inventor: Joseph M. Altman, 24245 Woodland Dr., Southfield, MI (US) 48034

( * ) Notice: Subject to any disclaimer, the term of this patent is extended or adjusted under 35 U.S.C. 154(b) by 29 days.

(21) Appl. No.: 10/905,981

(22) Filed: Jan. 28, 2005

(65) Prior Publication Data

US 2006/0170239 A1   Aug. 3, 2006

(51) Int. Cl.
B60P 7/02 (2006.01)
(52) U.S. Cl. .............................. 296/100.02; 296/26.04
(58) Field of Classification Search ........... 296/100.02, 296/26.04, 26.05
See application file for complete search history.

(56) References Cited

U.S. PATENT DOCUMENTS

| | | | |
|---|---|---|---|
| 4,603,901 A * | 8/1986 | McIntosh et al. ........... 296/165 |
| 4,613,181 A | 9/1986 | Rafi-Zadeh | |
| 4,673,209 A | 6/1987 | Rafi-Zadeh | |
| 5,031,949 A * | 7/1991 | Sorimachi et al. ............ 296/76 |
| 5,503,450 A | 4/1996 | Miller | |
| 6,623,062 B1 | 9/2003 | Hoffman | |
| 6,666,490 B1 | 12/2003 | Thacker | |
| 6,764,125 B2 | 7/2004 | Bacon | |
| 6,767,043 B1 | 7/2004 | Sanseviero | |

* cited by examiner

Primary Examiner—Joseph D. Pape
(74) Attorney, Agent, or Firm—TraskBritt

(57) ABSTRACT

A horizontal bed cover lift system for a vehicle having a hard tonneau cover, a unitary lift and an optional controller is provided. The unitary lift has a lift member that connects to an upper member and the upper member is connected to the cover. The lift member may retractably position the cover upwardly and the lift member may swivel the cover about the unitary lift. The unitary lift is also connected to a lower member that may be connected to the cargo area of a vehicle. In another embodiment the lower member is connected to the floor of a pick-up bed. Also, the optional controller is for controlling the unitary lift, whereby the controller may positionably control the unitary lift retractably raising the cover to an indicated height and whereby the controller may positionably control the lift member to swivel about the unitary lift when the cover is above a clearance height.

19 Claims, 2 Drawing Sheets

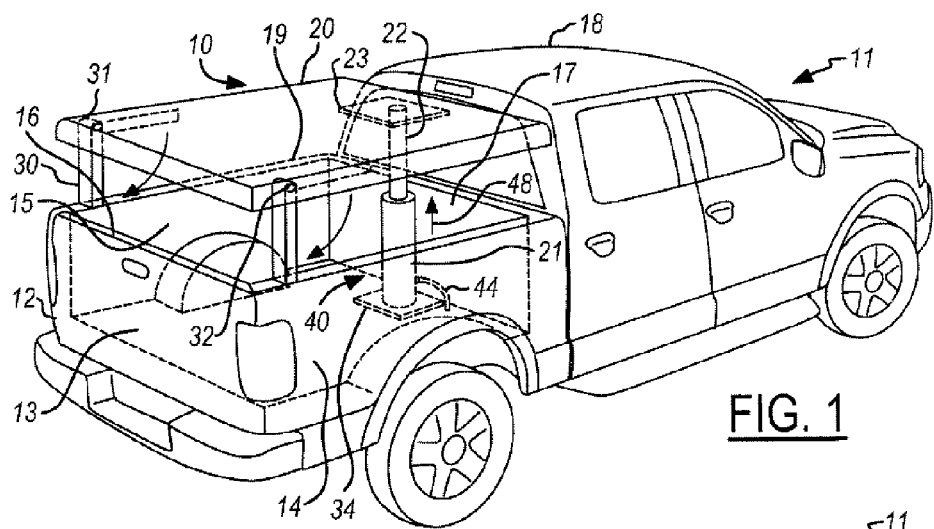
FIG. 1
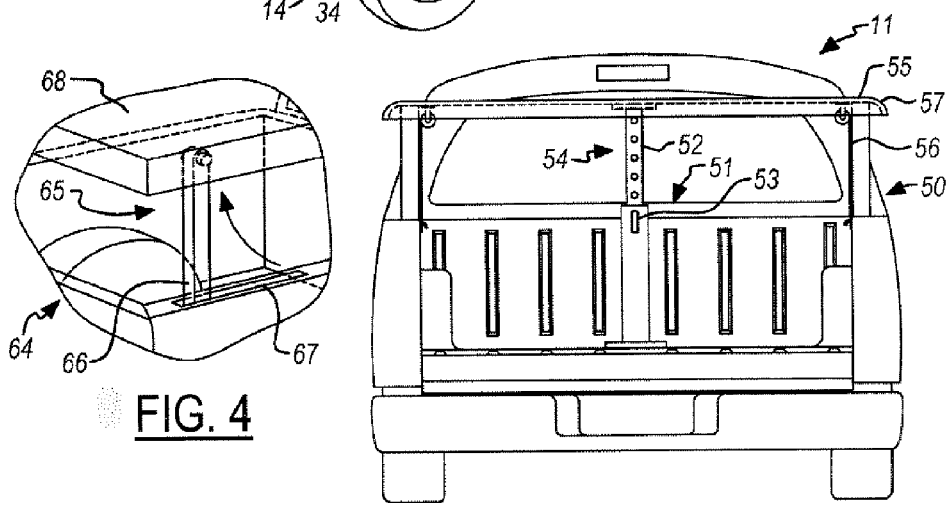
FIG. 4
FIG. 2
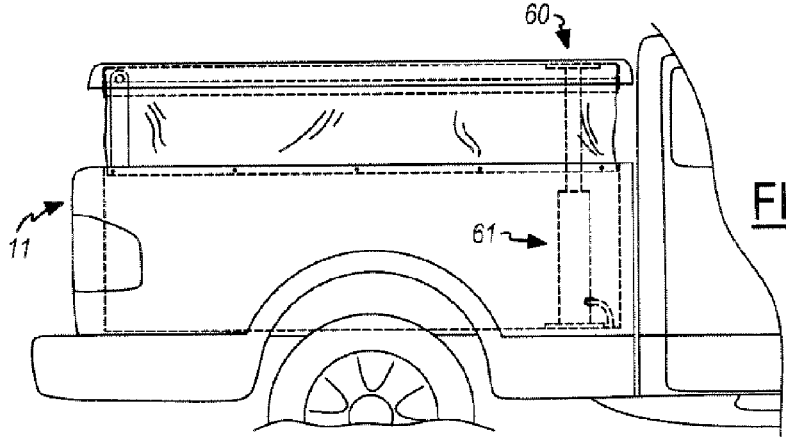
FIG. 3

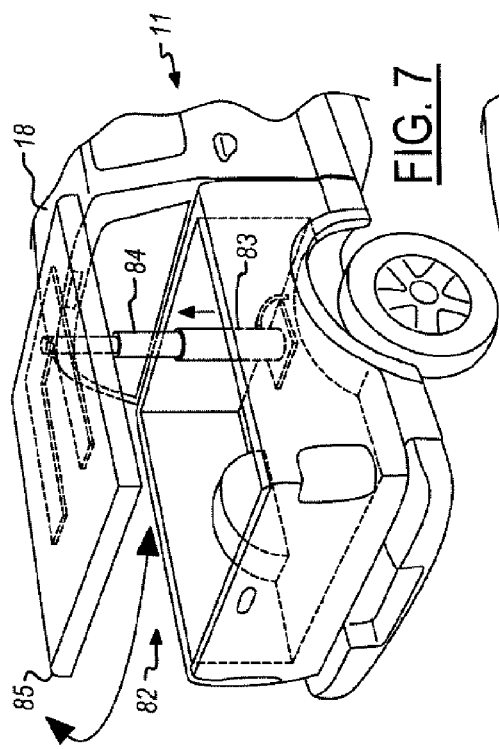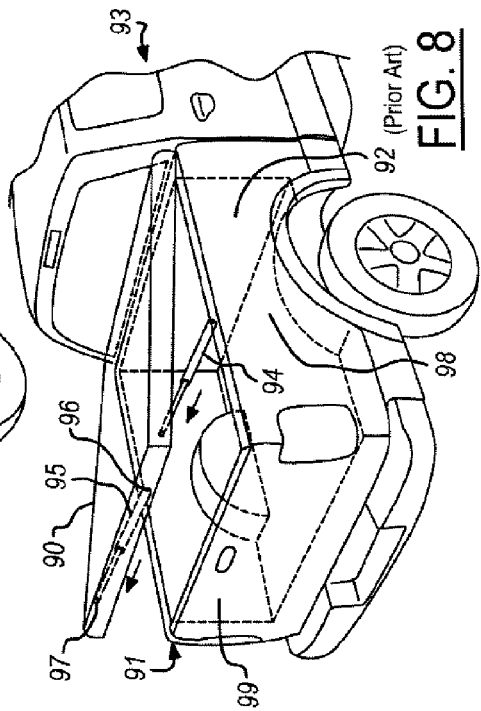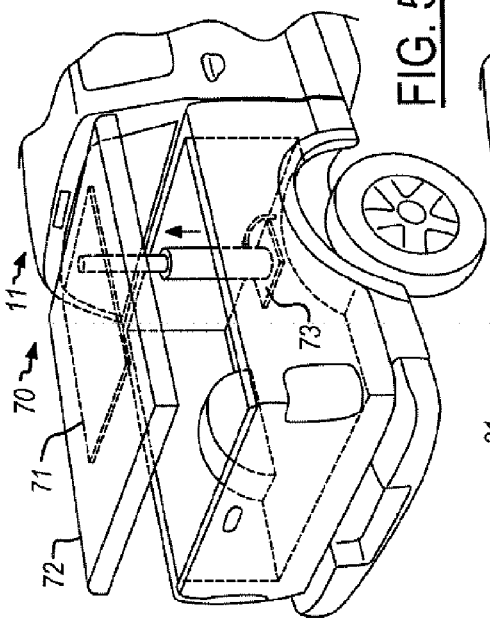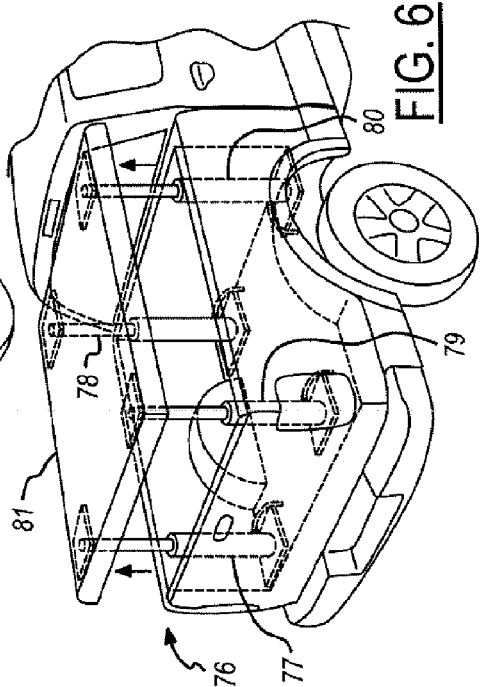

HORIZONTAL BED COVER LIFT SYSTEM

FIELD OF THE INVENTION

The present invention relates generally to truck bed covers and, more particularly, to a system for positioning a truck bed cover, such as a hard fiberglass cover or shell.

BACKGROUND OF THE INVENTION

Various hard covers or shells (also known as hard tonneau covers) are commercially available for installation onto pickups or truck beds. These covers serve the purpose of keeping the contents of the truck bed out of view, protecting the cargo under the cover, are generally weather tight, and limit unauthorized entry into the truck bed when the cover is securely mounted.

Most hard covers are pivotally mounted to the front of the truck bed and open in clamshell-like fashion at the rear of the pickup bed. This is mechanically simple and durable, however, access to the front of the truck bed is severely restricted. Cargoes tend to shift forward in truck beds, hence items tend to migrate to the front of the truck bed where they are least accessible due to the smaller side opening as one approaches the front of the pickup bed where the cover is pivotally mounted. One obstacle with hard covers is that if the cargo extends above the side walls of the truck bed the cover cannot be closed. Another obstacle is that very large items, e.g., a refrigerator or welding machine, may not fit into the pickup bed and under such a cover that is hinged to the front pickup bed. In an attempt to solve some of these problems, a hard cover is described in U.S. Pat. No. 6,666,490 entitled "Pickup Bed Cover." This cover rotatably raises the cover on four legs upward and backwardly to a fixed height and rear position. Although the cover increases the accessibility to the front of the pickup bed, it has the undesirable result in limiting the maximum cargo height. Also, loading access is impaired at the rear of the pickup bed because the cover is positioned into the loading area.

Another hard cover is described in U.S. Pat. No. 5,364,154 entitled "Liftable Rigid Truck Bed Cover." This hard cover opens on four legs operating as a parallelogram. From the closed position, the cover lifts upward and rearward along the arc of the pivoting legs. This achieves good access to the pickup bed as mentioned above. However, the geometry of the opening and closing mechanism requires four latch points to secure the cover in the closed position. Also, the cover is positioned into an area that restricts loading access at the rear of the pickup bed.

Another type of hard cover is described in U.S. Pat. No. 4,673,209 entitled "Cover Assembly For Pickup Truck Bed." The cover for the truck bed is mounted to the bed by four spring-loaded arms that allow the cover to be moved vertically relative to the bed. It has the advantage of increasing access to the entire truck bed. A disadvantage is the tedious opening and closing procedure which involves overcoming spring forces to raise and lower the cover at all four corners. Also, the cover must be manually locked into position in order to keep it positioned upright. Moreover, the covers require vertical stabilizers, which drop into the bed and may become entangled in the cargo when the cover is in the closed position.

Another type of cover is described in U.S. Pat. No. 6,767,043 entitled "Cover For Pick-Up Bed." The cover is a shutter assembly that slides within a track assembly to open up the bed cover for hauling large cargo items in the truck bed. It has the undesirable feature that the cargo is not coverable while the large cargo item is in the truck bed.

It is clear that there is a need for an improved lift system for pickup bed covers that allows for variable height positioning for hauling cargo. Also, it is desirable to have a cover lift system that increases the access and ease by which cargo may be loaded into the bed of a pickup.

BRIEF SUMMARY OF THE INVENTION

A horizontal bed cover lift system for a vehicle of the present invention is a combination of a hard tonneau cover and a unitary lift. In one embodiment of the present invention, the unitary lift has a lift member that connects to an upper member and the upper member is connected to the cover. The lift member may retractably position the cover upwardly and the lift member may swivel the cover about the unitary lift. The unitary lift is also connected to a lower member that may be connected to the cargo area of a vehicle. Optionally, the lower member may be connected to the floor of pick-up bed. The inventive aspects provide an improved lift system for a pickup bed covers that allows for variable height positioning for hauling cargo. Also, the inventive lift system increases the access and ease by which cargo may be loaded into the bed of a pickup.

In another embodiment the present invention may also include a controller in addition to the cover and the unitary lift. The controller is for controlling the unitary lift, whereby the controller may positionably control the unitary lift retractably raising the cover to an indicated height. Also, controller may positionably control the lift member to swivel about the unitary lift when the cover is above a clearance height. The swivel provides an additional attribute of the inventive lift system that increases the access and ease by which cargo may be loaded into the bed of a pickup.

In another embodiment, the present invention may include additional unitary lifts for retractably raising the cover.

One benefit of the present invention is that a single unitary lift will enable the cover to be positioned at a height above the vehicle bed.

Other aspects and advantages of the present invention will become apparent upon the following detailed description and appended claims, and upon reference to the accompanying drawings.

BRIEF DESCRIPTION OF THE DRAWINGS

FIG. 1 is a perspective view of a vehicle having a horizontal bed cover lift system in accordance with one embodiment of the present invention;

FIG. 2 is a rear elevation view of a vehicle having a horizontal bed cover lift system in accordance with a second embodiment of the present invention;

FIG. 3 is a partial side elevation view of a vehicle having a horizontal bed cover lift system in accordance with a third embodiment of the present invention;

FIG. 4 is a partial perspective view of a vehicle having a horizontal bed cover lift system in accordance with a forth embodiment of the present invention;

FIG. 5 is a partial perspective view of a vehicle having a horizontal bed cover lift system in accordance with a fifth embodiment of the present invention;

FIG. 6 is a partial perspective view of a vehicle having a horizontal bed cover lift system in accordance with a sixth embodiment of the present invention;

FIG. 7 is a partial perspective view of a vehicle having a horizontal bed cover lift system in accordance with a seventh embodiment of the present invention; and FIG. 8 is a partial perspective view of a vehicle having a hard tonneau cover mounted upon a vehicle in accordance with the known prior art.

DETAILED DESCRIPTION OF THE INVENTION

In the following detailed description, reference is made to the accompanying drawings which form a part hereof wherein like numerals designate like parts throughout, and in which is shown by way of illustration specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents. Also, in the figures the same reference numerals will be used to identify the same or equivalent components in the various embodiments.

The present invention provides a cover lift system to assist positioning the hard tonneau cover up off of a open bed of a truck, such as a pickup truck, by using hydraulic, mechanical, pneumatic, electrical or manual lifting mechanisms. Using a lifting mechanism as disclosed herein will enable raising a cover to a sustainable height that will facilitate cargo loading/unloading, oversized loads, access to the cargo bed, and provide for some protection from outdoor exposure to the cargo. Various embodiments of a cover lift system will be presented, each having inventive advantages.

FIG. 8 is a partial perspective view of a vehicle having a hard tonneau cover mounted upon a vehicle in accordance with the known prior art. Specifically, a common truck bed cover 90 includes, but is not limited to, a fiberglass panel that overlies the truck bed 91. The bed cover 90 is hingably coupled to a distal end 92 of the truck bed 91 adjacent the truck cab 93. The actuators or hydraulic shocks 94, 95, support the bed cover 90 in its rotated position. Each end of an actuator arm 96, 97 is pivotally coupled to the side walls 98, 99 of the truck bed 91. The actuator arm 96, 97 may be power assisted to facilitate opening about the hinge coupling. However, the known prior art has limitations, as mentioned above, which the present invention improves upon.

Turning to the present invention, FIG. 1 shows a perspective view of a vehicle 11 having a horizontal bed cover lift system 10 in accordance with one embodiment of the present invention. The vehicle 11 includes a vehicle bed 12 that is defined by a bed floor 13, upstanding opposite body side walls 14, 15, a tailgate 16, and a front wall 17 adjacent the driver's cab 18. The hard tonneau cover or cover 20 comprises a one-piece molded fiberglass reinforced plastic panel that is sized to overlie the top rim 19 of the side walls 14, 15, front wall 17, and tailgate 16 so as to cover the vehicle bed 12 when the cover 20 is in the lowered closed position (shown in a lifted position). The cover 20 can be made of other materials such as, but not limited to, sheet metal, plastic, or wood. The cover 20 may be retractably raised off of the top rim 19 of the vehicle bed 12 by a lift 21. Although the drawings are exemplary of a horizontal bed cover lift system used with a pickup truck, the present invention could also be practiced with any wheeled vehicle that has an opening that might require a covering.

The horizontal bed cover lift system 10 for a vehicle includes a cover 20, an upper member 23, a single or unitary lift 21, and a lower member 34. The unitary lift 21 includes a lift member 22, wherein the lift member may retractably position the cover 20 upwardly. The upper member 23 is supportively connected to the cover 20. The lift member 22 is supportively connected to the upper member 23. Likewise, the lower member 34 is supportively connected to the unitary lift 21, such that the lower member 34 may be connected to the bed floor 13 of the vehicle 11 enabling the cover 20 to be raised above the top rim 19 of the vehicle bed 12. A person of skill in the pertinent art would appreciate that the lower member 34 may be configured to supportively mount the lift system 10 to the top rim 19, either side walls 14, 15, front wall 17, bed floor 13 or other cargo areas of the vehicle 11.

The cover 20 of the horizontal bed cover lift system 10 according to the present embodiment is a hard tonneau cover. This type of cover is commercially available, customized to fit a particular vehicle, made typically from reinforced fiberglass, and is considered to be rigid. However, a person of skill in the art will appreciate that the cover 20 may optionally be made from a non-rigid material supported by a skeletal frame. Moreover, a person of skill in the art will recognize that the cover 20 may optionally have reinforced support members in the vicinity of where the upper member 23 is connected to the cover 20 in order to facilitate the structure's strength.

In this embodiment of the invention, the upper member 23 is connected to the lift member 22 of the unitary lift 21. A person of skill in the art will recognize that the lift member 22 and the upper member 23 may be integrally formed from a single material piece specifically adapted for connecting to the cover 20.

The attachment method in which the upper member 23 is connected to the cover 20, the lift member 22 is connected to the upper member 23, and the lower member 34 is connected to the unitary lift 21 is governed by the combination of materials used for each item as would be recognized by a person of skill in the art according to any one of the many ways known in the art, such as, without limiting the scope of the present invention, fastening, welding, gluing, screwing, or bolting, among others.

In the present embodiment the cover 20 is connected to the upper member 23 in a cantilevered position centered about the longitudinal sides of the cover 20 in order to use the present invention to advantage. However, one of skill in the art would recognize that the upper member 23 may be connected to the cover 20 in any other position or location.

The unitary lift 21 has a lift member 22 that is retractably extendable allowing a user to manually or automatically position the cover 20 above the vehicle bed 12. Optionally, the lift member 22 may be rotatably coupled to the unitary lift 21. The unitary lift 21 may be a hydraulic lift, pneumatic lift, electromechanical lift, magnetic lift, or mechanical lift. A person of skill in the pertinent art will recognize that the unitary lift 21 can also be constructed from gear sets or cable systems for lifting the lift member 22 to raise the cover 20. In the present embodiment the unitary lift 21 is a piston assembly, designated generally by the numeral 40, having ram. The ram is the lift member 22 in the present embodiment.

The piston assembly 40 is mounted in a manner within the vehicle bed 12, such as on the bed floor 13, as mentioned above for moving the cover 20 between an open and closed condition. To actuate the piston assembly 40, a signal is received on wire 44 from a controller (not shown) in communication with a power supply (not shown) that drives the ram or lift member 22 from a closed position to an adjustable position as indicated by arrow 48. Although in the present embodiment the piston assembly 40 is actuated electronically, other methods of actuation may be used such as the hydraulic system of a truck. It will further be appreciated that the piston assembly 40 may be of various suitable types, such as hydraulic, pneumatic, or electro-mechanical, for example and without limitation.

Therefore, in actual operation, an actuation signal is sent to the unitary lift 21 by operator actuation of either a remote control or a switch located in the cab of the vehicle. Once actuated, the unitary lift 21 will extend the cover 20, by forcing the lift member 22 retractably upward. As will be appreciated by those skilled in the art, the lift member 22 may be raised to any height within its length. Once the cover 20 is in its fully extended or other open position, the vehicle bed 12 may be easily accessed to either place equipment or valuables within the vehicle bed 12 or remove the equipment or valuables therefrom. Upon completion of the work in the vehicle bed 12, the horizontal bed cover lift system 10 may be reactuated to lower the cover 20 upon the top rim 19 of the vehicle bed 12, upon the equipment in the vehicle bed, or leave it up while the vehicle 11 travels.

Optionally, as shown in FIG. 1, the horizontal bed cover lift system 10 may include one or more adjustable support members 30. In this embodiment, two adjustable support members 30 are shown adjustably attached to the cover 20 at two locations 31, 32. The adjustable support member 30 is pivotally joined to the cover 20 enabling positioning onto the top rim 19 or bed floor 13 of the vehicle bed 12. The adjustable support member 30 when adjusted and positioned provides additional support for the cover 20 while the vehicle 11 is in motion. The adjustable support member 30 may be constructed from two or more pieces (not shown) enabling the adjustabel support member 30 to be adjusted to any height the cover 20 is lifted. A person of skill in the art will recognize that the adjustable support member 30 may be positioned at various locations and may be constructed from telescopic parts or jointed parts in order to enhance stability while the vehicle 11 is in motion.

FIG. 2 is a rear elevation view of a vehicle 11 having a horizontal bed cover lift system 50 in accordance with a second embodiment of the present invention. The horizontal bed cover lift system 50 includes a unitary lift 51 having a lift member 52. The unitary lift 51 of this embodiment is a mechanical structure that is manually manipulated in order to raise a cover 55 and may be secured at a height by inserting pin 53 through the unitary lift 51 into one of the holes 54 located upon the lift member 52.

Optionally, as shown in FIG. 2, the horizontal bed cover lift system 50 may include a curtain coupled to one of the outer edges 57 of the cover 55 and removably attached to one of the side wall 14, 15 of the vehicle 11. A person of skill in the art will appreciate that each outer edge 57 of the cover 55 may have a curtain fixedly attached that is removably attachable to a corresponding side wall i.e., side walls 14, 15, tailgate 16 or front wall 17, of the vehicle bed 12. The curtain 56 is retractably expandable as the cover 55 is positioned above the vehicle bed 12. The curtain 56 partially encloses the vehicle bed 12 protecting cargo from the weather when the cover 55 is in a lifted position. A person skilled in the art will appreciate that the curtain 56 may be attached to any other curtain in order to more adequately protect the cargo.

FIG. 3 is a partial side elevation view of a vehicle 11 having a horizontal bed cover lift system 60 in accordance with a third embodiment of the present invention. The horizontal bed cover lift system 60 in this embodiment has an electro-mechanical unitary lift 61. The horizontal bed cover lift system 60 of this embodiment also depicts an optional curtain (as shown in FIG. 2) and optional adjustable support members (as shown in FIG. 1).

FIG. 4 is a partial perspective view of a vehicle 11 having a horizontal bed cover lift system 64 in accordance with a fourth embodiment of the present invention. Here the adjustable support member 65 is shown having an end 66 that is slideably positioned in a track 67 to support the cover 68 in a raised position. The track 67 may be positioned upon the top rail 19, a side wall 14, 15, or on the bed floor 13 of the vehicle 11.

FIG. 5 is a partial perspective view of a vehicle 11 having a horizontal bed cover lift system 70 in accordance with a fifth embodiment of the present invention. The upper member 71 is enlarged to support and increase the rigidity of the cover 72 in order to decrease the effect of turbulence caused by air while the vehicle 11 is in motion. A person of skill in the art will appreciate that the upper member 71 may be made or fashioned in numerous shapes, such as the upper member 23 shown in FIG. 6. Also, the lower member 73 may have a customized shape in order to better support the unitary lift 21 on the vehicle bed 12.

FIG. 6 is a partial perspective view of a vehicle 11 having a horizontal bed cover lift system 76 in accordance with a sixth embodiment of the present invention. Here the horizontal bed cover lift system 76 includes four lifts 77, 78, 79, 80 positioned in various locations in the vehicle bed 12. A person of skill in the art will recognize that any number of unitary lifts may be used in order to raise the cover 81, but in consideration of expense, one lift is preferential.

FIG. 7 is a partial perspective view of a vehicle 11 having a horizontal bed cover lift system 82 in accordance with a seventh embodiment of the present invention. In this embodiment the unitary lift 83 has a telescopic ram or lift member 84 enabling the cover 85 to reach a height greater than the height of the driver's cab 18. A person of skill in the art will appreciate that a telescopic ram may have any number of telescopic sections and may be actuated as mentioned above.

When the horizontal bed cover lift system 82 exceeds a clearance height above the driver's cab 18, then the cover 85 may be rotated or swiveled about the unitary lift 83 allowing greater access to the cargo area for loading and unloading.

Optionally in the present embodiment, a controller (not shown) may be used for controlling the unitary lift 83, whereby the controller may positionably control the unitary lift 83 retractably raising the cover 85 to an indicated height and the controller may positionably control the lift member 84 to swivel cover 85 about the unitary lift 83 when the cover 85 is above a clearance height.

The present invention may be used to advantage by using a single unitary lift, which will enable the cover to be positioned at a height above the vehicle bed when the lift is correctly mounted to the cover and bed.

While the invention has been described in connection with one or more embodiments, it should be understood that the invention is not limited to those embodiments. On the contrary, the invention is intended to cover all alternatives, modifications, and equivalents, as may be included within the spirit and scope of the appended claims.

What is claimed is:

1. A horizontal bed cover lift system for a vehicle comprising:
 a cover;

an upper member coupled to the cover, the upper member having a single attachment location and;

a unitary lift having a lift member coupled to the single attachment location of the upper member allowing the cover to swivel about the unitary lift and the lift member to retractably position the cover upwardly; and a lower member coupled to the unitary lift, the lower member is mountable to a cargo area of a vehicle.

2. The horizontal bed cover lift system according to claim 1, wherein the lower member is mountable to a bed floor of the vehicle.

3. The horizontal bed cover lift system according to claim 1, wherein the cover is a rigid cover.

4. The horizontal bed cover lift system according to claim 1, wherein the cover is a hard tonneau cover.

5. The horizontal bed cover lift system according to claim 1, wherein the cover includes a reinforced support member.

6. The horizontal bed cover lift system according to claim 1, wherein the upper member is the lift member of the unitary lift.

7. The horizontal bed cover lift system according to claim 1, wherein the upper member is coupled to the lift member of the unitary lift.

8. The horizontal bed cover lift system according to claim 1, wherein the cover is cantilevered to the upper member.

9. The horizontal bed cover lift system according to claim 1, wherein the cover swivels about the unitary lift when the cover is above a clearance height.

10. The horizontal bed cover lift system according to claim 1, further including a controller for controlling the unitary lift for positioning the cover.

11. The horizontal bed cover lift system according to claim 1, further including at least one adjustable support member.

12. The horizontal bed cover lift system according to claim 1, further including at least one curtain coupled to at least one edge of the cover, wherein the curtain is retractably expandable and is engageably mountable to one of the side walls of the vehicle.

13. A horizontal bed cover lift system for a vehicle consisting of:
    a cover;
    an upper member coupled to the cover;
    a unitary lift having a lift member coupled to the upper member, wherein the lift member retractably positions the cover upwardly and the cover swivels about the unitary lift; and
    a lower member coupled to the unitary lift, the lower member is mountable to a bed of a vehicle.

14. The horizontal bed cover lift system according to claim 13 consisting further of a controller for controlling the unitary lift for positioning the cover.

15. The horizontal bed cover lift system according to claim 13, wherein the cover swivels about the unitary lift when the cover is above a clearance height.

16. The horizontal bed cover lift system according to claim 13, wherein the cover includes a reinforced support member.

17. The horizontal bed cover lift system according to claim 13, further including at least one adjustable support member.

18. The horizontal bed cover lift system according to claim 13, further including at least one curtain coupled to at least one edge of the cover, the curtain is retractably expandable and is engageably mountable to one of the side walls of the vehicle.

19. A vehicle having a horizontal bed cover lift system comprising:
    a truck having a floor in a cargo area;
    a hard tonneau cover;
    an upper member coupled to the cover;
    a unitary lift having a lift member coupled to upper member, wherein the lift member retractably positions the cover upwardly;
    a lower member coupled the unitary lift, whereby the lower member is coupled to a floor of a cargo area of the truck; and
    a controller for controlling the unitary lift, the controller may positionably control the unitary lift retractably raising the cover to an indicated height and the controller may positionably control the lift member to swivel about the unitary lift when the cover is above a clearance height.

* * * * *

UNITED STATES PATENT AND TRADEMARK OFFICE
CERTIFICATE OF CORRECTION

PATENT NO. : 7,226,108 B2  Page 1 of 1
APPLICATION NO. : 10/905981
DATED : June 5, 2007
INVENTOR(S) : Joseph M. Altman It is certified that error appears in the above-identified patent and that said Letters Patent is hereby corrected as shown below:

| | | |
|---|---|---|
| COLUMN 2, | LINE 21, | change "of pick-up bed." to --of the pickup bed.-- |
| COLUMN 2, | LINE 22, | change "covers" to --cover-- |
| COLUMN 2, | LINE 31, | change "controller may" to --the controller may-- |
| COLUMN 2, | LINE 60, | change "a forth" to --a fourth-- |
| COLUMN 3, | LINE 44, | change "actuator arm 96, 97" to --actuator arms 96, 97-- |
| COLUMN 4, | LINE 55, | change "electromechanical lift," to --electro-mechanical lift,-- |
| COLUMN 5, | LINE 36, | change "the adjustabel" to --the adjustable-- |
| COLUMN 5, | LINE 54, | change "side wall 14, 15" to --side walls 14, 15-- |
| COLUMN 6, | LINE 13, | change "top rail 19," to --top rim 19,-- |
| CLAIM 19, COLUMN 8, | LINE 30, | change "to upper" to --to the upper-- |

Signed and Sealed this

Twenty-second Day of July, 2008

JON W. DUDAS
*Director of the United States Patent and Trademark Office*